United States Patent
Akamaru

[19]

[11] Patent Number: 5,424,956
[45] Date of Patent: Jun. 13, 1995

[54] OPERATING STATUS DISPLAY FOR ARTICLE PROCESSING SYSTEM

[75] Inventor: Hidefumi Akamaru, Ishikawa, Japan

[73] Assignee: Shibuya Kogyo Co., Ltd., Kanazawa, Japan

[21] Appl. No.: 304,420

[22] Filed: Jul. 12, 1994

Related U.S. Application Data

[63] Continuation of Ser. No. 951,198, Sep. 25, 1992.

[30] Foreign Application Priority Data

Sep. 27, 1991 [JP] Japan ................................ 3-276948

[51] Int. Cl.[6] .............................................. G06F 15/46
[52] U.S. Cl. .................................... 364/478; 364/188; 364/468; 235/375; 414/274
[58] Field of Search ................................ 395/155–161; 364/188, 478, 468; 235/375, 376, 492; 340/825.3, 825.31; 414/222, 266, 273, 274, 416, 417, 799

[56] References Cited

U.S. PATENT DOCUMENTS

| | | | |
|---|---|---|---|
| 4,866,628 | 9/1989 | Natarajan | 364/468 |
| 4,887,218 | 12/1989 | Natarajan | 364/468 |
| 4,974,166 | 11/1990 | Maney et al. | 364/478 |
| 5,166,884 | 11/1992 | Maney et al. | 364/468 |
| 5,228,820 | 7/1993 | Stansfield et al. | 414/278 |

FOREIGN PATENT DOCUMENTS 3-162207  7/1991  Japan.

Primary Examiner—Roy N. Envall, Jr.
Assistant Examiner—Cameron H. Tousi
Attorney, Agent, or Firm—Flynn, Thiel, Boutell & Tanis

[57] ABSTRACT

For an article processing system which includes a filler and a capper, for example, an operating status display is provided which is capable of monitoring the operating status of the filler or capper under an optimum condition. The system includes a filler and a capper as article processors, each of which includes a plurality of sensors, and information derived by these sensors are stored in a memory at corresponding addresses. A controller includes an editor which permits a suitable location on display means to be allocated for a selected one of the addresses, and allows information stored in the memory at a specified address to be displayed on the display means at a location allocated by the editor. In this manner, any desired information detected by the sensors may be easily displayed on the display means in any desired combination.

6 Claims, 4 Drawing Sheets

FIG.4

| | NUMBER OF PROCESSED ARTICLES | NUMBER OF FAULTY ARTICLES | REJECTION RATE |
|---|---|---|---|
| FILLER | 'A23' | 'A24' | '$\frac{A24}{A23+A24}$' |
| CAPPER | 'B23' | 'B24' | '$\frac{B24}{B23+B24}$' |
| CASER | 'N23' | 'N24' | '$\frac{N24}{N23+N24}$' |

REJECTION RATE

REJECTION RATE

|  | NUMBER OF PROCESSED ARTICLES | NUMBER OF FAULTY ARTICLES | REJECTION RATE |
|---|---|---|---|
| FILLER | 'A' | 'B' | 'C' |
| CAPPER | 'D' | 'E' | 'F' |
| CASER | 'G' | 'H' | 'I' |

— 14A

REM COMMENTS

A = 'A23'
B = 'A24'
C = B/(A+B)
D = 'B23'
E = 'B24'
F = E/(D+E)
G = 'N23'
H = 'N24'
I = H/(G+H)

— 14B

14

OPERATING STATUS DISPLAY FOR ARTICLE PROCESSING SYSTEM

This application is a continuation of U.S. Ser. No. 07/951,198, filed Sep. 25, 1992.

FIELD OF THE INVENTION

The invention relates to an article processing system which includes a filler or capper, for example, and more particularly, to an operating status display which enables a monitoring of the operating status of such filler or capper under an optimum condition.

DESCRIPTION OF THE PRIOR ART

An article processing system is well known in the art as one including a filler which fills an article supplied thereto with a liquid to be filled therein, and a capper disposed downstream of the filler to provide a capping of the filled article. The system includes a controller which controls the operation of the filler or capper. In an article processing system of the kind described, filler or capper is each provided with a sensor so that information delivered from the individual sensors may be displayed on display means on the controller in order to monitor the operating status of the filler or or capper.

More specifically, information displayed for the filler includes an indication of whether the filler is in operation or at rest, what the kind of the liquid being filled is, how much the balance of the liquid in liters is, or what the temperature is. Information displayed for the capper includes an indication of whether the capper is in operation or at rest, the variety of a particular cap, the remaining supply of caps or the like.

The controller is arranged to display such information in a pattern which is predetermined for the display means. However, when the pattern in which information is displayed on the display means is predetermined and fixed, it is impossible to provide a display of the operating status in a different pattern unless a software operating the controller is changed, but such change is not a simple matter to implement on the field, but rather requires much labor and time, resulting in an expensive procedure.

SUMMARY OF THE INVENTION

In view of the foregoing, the invention provides an operating status display for article processing system in which any required pattern of operating status can be very easily established on the field without requiring a change in the software operating the controller.

Thus, the invention relates to an article processing system including a plurality of article processors each of which is operable to process articles supplied thereto, a plurality of sensors each of which is associated with the respective article processor to detect the operating status of various parts thereof, and a controller receiving information from the respective sensors and displaying such information in a predetermined pattern on display means. In accordance with the invention, the controller includes a memory having addresses corresponding to the individual sensors so that information delivered from the individual sensors may be stored in the memory at the corresponding addresses. In addition, the controller includes an editor which is capable of allocating a specifiable location on the display means for each address. The controller then operates to display information stored in the memory at a particular address at a location on the display means which is specified in this manner.

With the described arrangement, when it is desired to display a variety of information in a pattern or patterns which are not previously provided in the controller, the editor in the controller may be utilized to specify a selected location on the display means for an address from which the information is derived. This greatly facilitates the display of necessary information in a desired pattern.

Above and other objects, features and advantages of the invention will become apparent from the following description of an embodiment thereof with reference to the attached drawing.

BRIEF DESCRIPTION OF THE DRAWING

FIG. 4 is an example of a display pattern produced by the editor.

FIG. 5 is the same display pattern of FIG. 4 produced by the editor in another embodiment of the invention.

DETAILED DESCRIPTION OF EMBODIMENT

Figure 1:
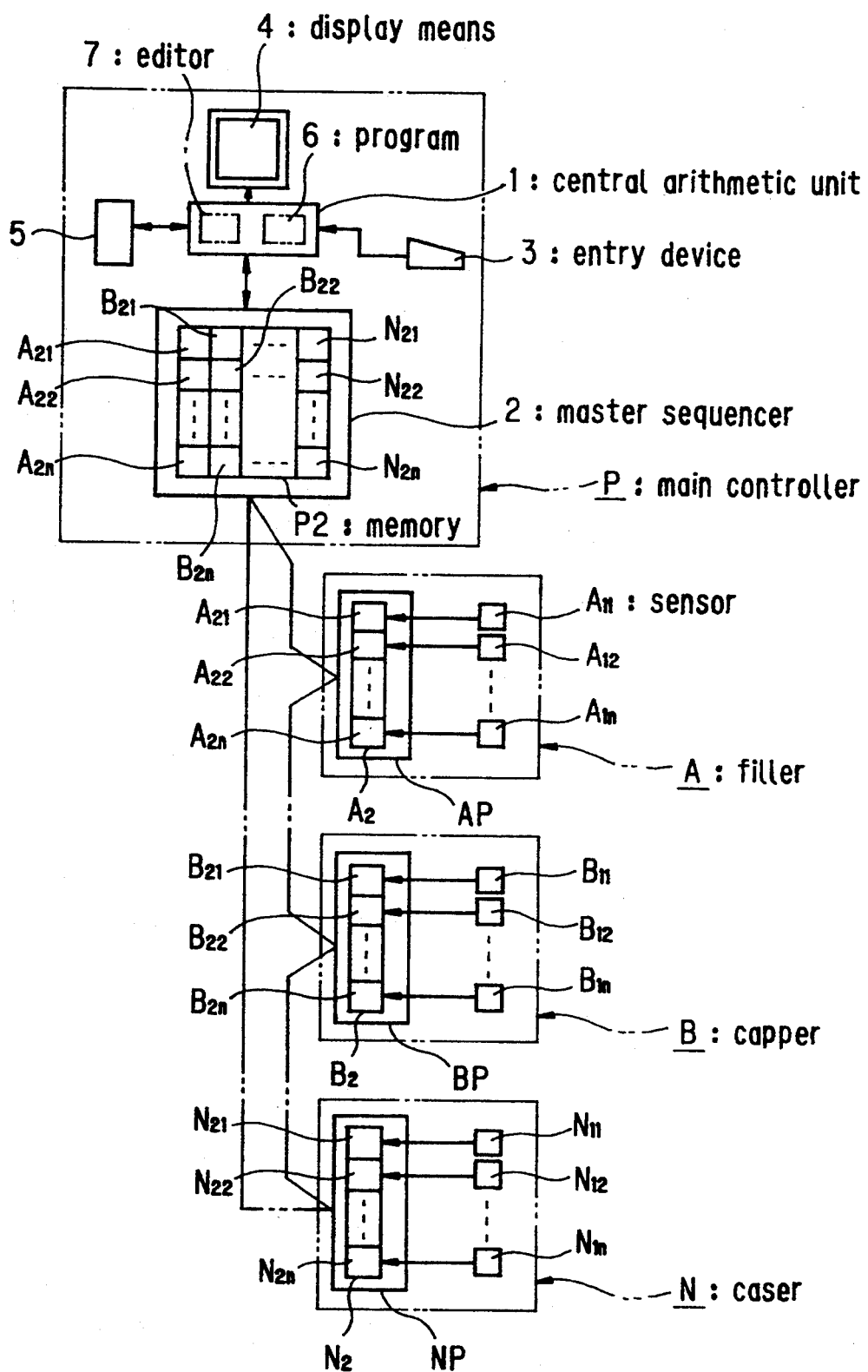
FIG. 1 is a schematic view of one embodiment of the invention.

Referring to FIG. 1, there are shown a filler A which fills an article supplied thereto which a liquid to be filled therein, thus representing one of article processors, a capper B disposed downstream of the filler A for providing a capping of the articles supplied from the filler A, and a caser N disposed downstream of the capper B for containing those articles which have moved past the capper B into a box, again representing another one of article processors. In addition to those described above, article processors also include a labeller and a conveyor unit which provide an interconnection between the individual article processors. The operation of the individual article processors A, B-N is controlled by a main controller P.

In the embodiment shown, the main controller P comprises a central arithmetic unit 1, a master sequencer 2 which communicates signals to or from the central arithmetic unit 1, an entry device 3 for inputting data indicating the variety of an article to be processed or an operation start command or the like to the central arithmetic unit 1 from the exterior, display means 4 for displaying a variety of information, and an external memory 5 for storing various data such as representing the operating status.

On the other hand, the filler A includes a plurality of sensors A11, A12-A1n. By way of example, sensor A11 detects if the filler A is in operation or at rest, with its result of detection being stored in a memory A2 of a sub-controller AP associated with the filler A at a given address A21.

Sensor A12 is adapted to detect the number of articles which have been processed by the filler A or which have moved past the filler A, with its result of detection being stored in the memory A2 at another given address A22. Finally, sensor A1n is adapted to detect the remaining quantity of liquid in a filler tank, with its result of detection being stored in the memory A2 at a further given address A2n.

In addition, it may be necessary in the filler A to change the elevation of the filling liquid tank thereof in accordance with the size of a new article whenever the variety of articles is changed in the filler A. Also, for a filler of piston pump type, it may be necessary to vary the angular position of a skewed cam in a rocking cam mechanism to alter the vertical stroke of a piston in order to change the amount of liquid being filled. Additionally, it may be necessary to modify the crosswise position of a guide which is used to convey articles within the filler.

In these instances, a drive source such as servo motor may be used to elevate the liquid tank, to alter the angular position of the skewed cam or to shift the guide position. Suitable means such as limit switches may be used to detect whether or not the liquid tank, the cam or the guide has been displaced to their respective given locations. Information from these means are stored in the memory A2 at given addresses.

While not shown, the capper B and the caser N similarly include a plurality of sensors B11, B12-B1n, - - - N11, N12-N1n, and sub-controllers BP-NP. The results detected by the individual sensors are stored in respective memories B2-N2 in the associated sub-controllers BP-NP at addresses B21, B22-B2n, - - - N21, N22-N2n.

The master sequencer 2 in the main controller P receive signals fed from the respective sub-controllers AP, BP-NP, and store the content stored in the respective memories A2, B2-N2 at addresses A21, A22-A2n, - - - N21, N22-N2n in its memory P2 at predetermined addresses.

The main controller P stores a program 6 within the central arithmetic unit 1 which utilized for displaying required information from the memory P2 at given addresses on the display means 4. By using a command from the entry device 3, such program 6 may be used to display such information in a predetermined pattern on the display means 4.

Figure 2:
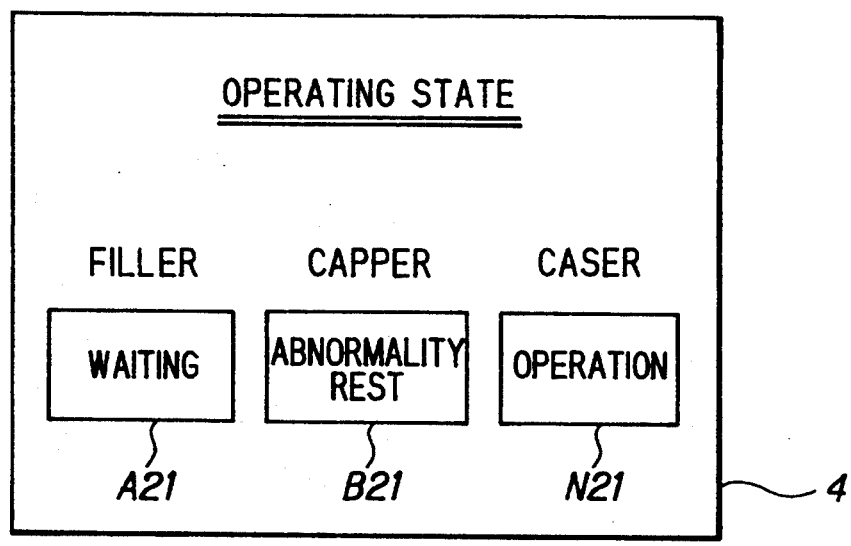
FIG. 2 is an example of a display pattern previously provided in the controller.
Figure 3:
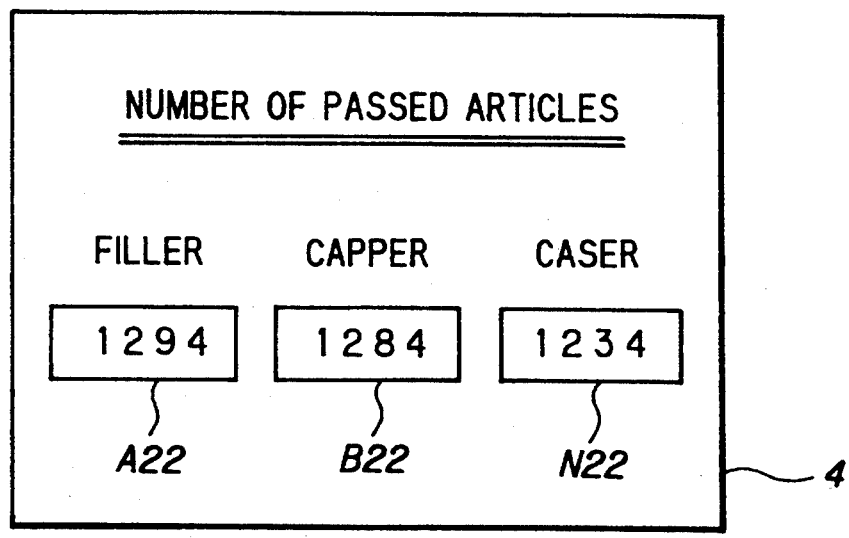
FIG. 3 is another example of a display pattern previously provided in the controller.

More specifically, FIG. 2 shows a display pattern in the program 6 for indicating whether or not all the article processors A and B to N are in operation, for instance "OPERATION", "ABNORMALITY REST", indicating a state of rest due to abnormality and "WAITING" indicating a state of rest due to the rest of a downstream apparatus although there is no abnormality in the machine itself. When this pattern is selected, the program 6 allows the contents stored at addresses A21 and B21 to N21, for instance, which contents indicate the state of the article processors A and B to N, to be displayed on the display means 4. FIG. 3 shows a pattern for displaying the numbers of articles passed through all the article processors A and B to N. When this pattern is selected, the program allows the contents at addresses A22 and B22 to N22, for instance, to be displayed on the display means 4.

The contents at the addresses A22 and B22 to N22 indicating the numbers of articles passed, as shown in FIG. 3, usually are the same as those of the signals from the sensors. Thus, the contents at the addresses A22 and B22 to N22 may be displayed as such on the display means 4. However, the expressions "OPERATION", "ABNORMALITY REST" and "WAITING" as shown in FIG. 2, do not have the contents of signals stored at the individual addresses A21 and B21 to N21 from the sensors. Therefore, they are substituted for by words meaning the pertinent contents according to sensor signals.

Furthermore, when the variety of articles is changed, a pattern which is included in the program 6 may be utilized to recognize the situation or progress of a re-modelling operation which takes place in each article processor A, B-N on the display means 4, thus affording many variable information.

However, it will be understood that the number of patterns representing all the combinations of such information will be prohibitively large to be entirely included in the program 6. Accordingly, it may be sometimes desired to display information in a pattern which is not previously included in the program 6. Changing the program 6 on the field in such instance is substantially impossible, and much time and labor will be required to change the program 6.

To accommodate for this, in the present embodiment, the central arithmetic unit 1 includes a programmable editor 7, which is operable through the entry device 3 so as to allocate, for any desired one of addresses A21, A22-A2n, - - - N21, N22-N2n, a suitable location on the display means 4.

The main controller P is then operable to display information stored in the memory at the specified address on the display means 4 at the allocated location. In this manner, a selected one of information stored at addresses A21, A22-A2n, - - - N21, N22-N2n may be easily displayed on the display means 4 in a desired pattern.

FIG. 4 shows an example of the display produced by the editor 7. In producing the display, the editor 7 first writes "REJECTION RATE", a title of the display, in the top line thereof. Then, immediately under this title, it writes "NUMBER OF PROCESSED ARTICLES", the number of normally processed articles, "NUMBER OF FAULTY ARTICLES" and "REJECTION RATE" in this order from the left. Then, adjacent the left edge of the display and right under the above line of words it writes words "FILLER", "CAPPER" and "CASER" in this order from the top.

At the intersection between the column of "NUMBER OF PROCESSED ARTICLES" and row of "FILLER", it writes, for instance, 'A23', the address at which the number of normally processed articles is indicated. At this time, the address A23 is shown marked as 'A23'. In this way, it can be conveyed to the central arithmetic unit 1 that the expression is not a word "A23" but indicates the address A23. In this part, the central arithmetic unit 1 displays not a word "A23" but the content at the address A23, i.e., the number of articles normally processed by the filler.

Likewise, at the intersection between the column of "NUMBER OF PROCESSED ARTICLES" and row of "CAPPER", the editor writes the address B23, at which the number of articles normally processed by the capper is indicated, and at the intersection between the "NUMBER OF PROCESSED ARTICLES" and row of "CASER" it writes the address N23, at which the number of articles normally processed by the caser is indicated. Further, it writes the address A24, at which the number of faulty articles resulting in the filler, at the intersection between the column of "NUMBER OF FAULTY ARTICLES" and row of "FILLER", the address B24, at which the number of faulty articles resulting in the capper, at the intersection between the column of "NUMBER OF FAULTY ARTICLES" and row of "CAPPER", and the address N24, at which the number of faulty articles resulting in the caser, at the intersection between the column of "NUMBER OF FAULTY ARTICLES" and row of "CASER".

Then, at the intersection between the column of "REJECTION RATE" and row of "FILLER" the editor writes a calculation formula A24/(A23+A24), representing the rejection rate, i.e., the number of faulty articles divided by the number of all the processed articles, in the filler. This has a meaning of an instruction to display the quotient of division of the content at the address A24 by the sum of the values at the addresses A22 and A23. Thus, the rejection rate in the filler can be displayed at the intersection between the column of "REJECTION RATE" and row of "FILLER".

Likewise, a calculation formula B24/(B23+B24) may be written at the intersection between the column of "REJECTION RATE" and row of "CAPPER", and a formula N24/(N32+N24) at the intersection between the column of "REJECTION RATE" and row of "CASER".

FIG. 5 shows a modification of the display in FIG. 4. While in the case of FIG. 4 addresses are directly written in the display area, in the case of FIG. 5 variables are substituted for the contents at the addresses in a portion which is not displayed on the display, and they are displayed on the display.

More specifically, in the case of FIG. 5 the editor of this embodiment can work out a document 14 which is displayed on the display means 4. The document for display is scrolled by the editor and is entirely displayed on the display means 4. However, the central arithmetic unit 1 is adapted to display only a predetermined number of first leading lines, for instance a leading line portion 14A of 24 lines, of the display document 14.

Like FIG. 4, the words "NUMBER OF PROCESSED ARTICLES", "NUMBER OF FAULTY ARTICLES" and "REJECTION RATE" and words "FILLER", "CAPPER" and "CASER" are written on the display area 14A. However, what are written at the intersections between the columns and rows are not addresses but individual variables "A" to "I" in the marked form, i.e., "'A'" to "'I'", thus conveying to the central arithmetic unit 1 that these expressions do not mean mere words "A" to "I" but mean the contents of the individual variables. The central arithmetic unit 1 thus displays not the words "A" to "I" but the contents of the individual variables.

In a non-display portion 14B following the display portion 14A, definition sentences defining the contents of the variables "A" to "I" are written. In the illustrated embodiment, the variable "A" is defined such that it indicates the content at the address A23, i.e., the number of normally processed articles in the filler. Thus, the central arithmetic unit 1 allows the content at the address A23, i.e., the number of normally processed articles in the filler to be displayed on a variable portion at the intersection "A" between the column of "NUMBER OF PROCESSED ARTICLES" and row of "FILLER".

Likewise, the variable "B" is defined to be the content at the address A24, i.e., the number of faulty articles resulting in the filler. The variable "C" consists of a calculation formula dealing with the variables "A" and "B". Thus, like the case of FIG. 4, the faulty factor in the filler can be displayed.

The other variables "D" to "I" are also defined such as to be able to obtain the same results as in the case of FIG. 4. Further, in the non-display port 14B necessary comments may be provided in necessary portions in addition to the variable definition portion with announcement of such comments given with, for instance, command "REM".

In this embodiment, addresses are not directly written but variables substituted for the contents at the addresses are written in the display portion 14A. However, these variables are substantially identical with the addresses. Therefore, this corresponds to the writing of the addresses.

Further, it is of course possible that a pattern prepared in the editor 7 is stored in the external memory 5 so that is may be derived therefrom whenever it is required. In addition, instead of displaying information at each address as such, such information may be modified, added with explanatory sentences or otherwise processed before the display as in the above case, for instance. Further, the pattern as noted above need not be provided in the program 6; for example all the pattern may be formed by the editor 7 alone, or the editor 7 may modify a pattern preliminarily provided in the program 6.

While the invention has been shown and described above in connection with an embodiment thereof, it should be understood that a number of changes, modifications and substitutions therein will readily occur to one skilled in the art from the above disclosure without departing from the spirit and scope of the invention defined by the appended claims.

What is claimed is:

1. An operating status display for an article processing system comprising: a plurality of article processors each operable to process articles supplied thereto, a plurality of sensors associated with each of the article processors to detect the operating status of various parts thereof, and a controller for receiving information from the respective sensors and for displaying such information in a predetermined pattern on display means; wherein the operating status display includes the controller having a memory with addresses which correspond to the respective sensors, information delivered from the respective sensors being stored in the memory at the corresponding addresses, the controller also having an editor which is operable by a user to enter a user-defined function which identifies at least one of said memory addresses and which defines an element of information as a function of the information stored at each said memory address identified in said function, said editor also being operable by a user to define for display on the display means a user-defined screen format which includes a user-designated location on the display means, the user-defined screen format displaying at the user-designated location the element of information derived according to the user-defined function from the information stored in the memory.

2. An operating status display according to claim 1 in which the article processors include a filler which fills an article with a liquid, a capper which applies a cap to the article processed by the filler, and a caser which packs the processed and capped article in a box, the filler, capper and caser being sequentially disposed from the upstream to the downstream side.

3. An operating status display according to claim 2 in which the controller includes a main controller which is separate from the filler, the capper and the caser.

4. An operating status display according to claim 3 in which the main controller includes a central arithmetic unit which includes the editor, the editor being a program.

5. An operating status display according to claim 4 in which the editor can be manipulated through a manual entry device so that the user-designated location on the display means may be allocated for a desired one of the addresses.

6. An operating status display according to claim 2 in which the filler, the capper and the caser each include a sub-controller and a memory.

* * * * *

UNITED STATES PATENT AND TRADEMARK OFFICE
CERTIFICATE OF CORRECTION

PATENT NO. : 5 424 956
DATED : June 13, 1995
INVENTOR(S) : Hidefumi AKAMARU

It is certified that error appears in the above-indentified patent and that said Letters Patent is hereby corrected as shown below:

Title page, item [22] please change the filing date;
"July 12, 1994" to ---September 12, 1994---.

Signed and Sealed this

Seventeenth Day of October, 1995

Attest:

BRUCE LEHMAN

Attesting Officer

Commissioner of Patents and Trademarks